April 7, 1942.   W. T. BROPHY   2,278,767
COFFEE ROASTER
Filed June 12, 1939   3 Sheets-Sheet 1

WALTER T. BROPHY INVENTOR

BY *George E. Adams*
ATTORNEY

April 7, 1942.　　　W. T. BROPHY　　　2,278,767
COFFEE ROASTER
Filed June 12, 1939　　　3 Sheets-Sheet 2
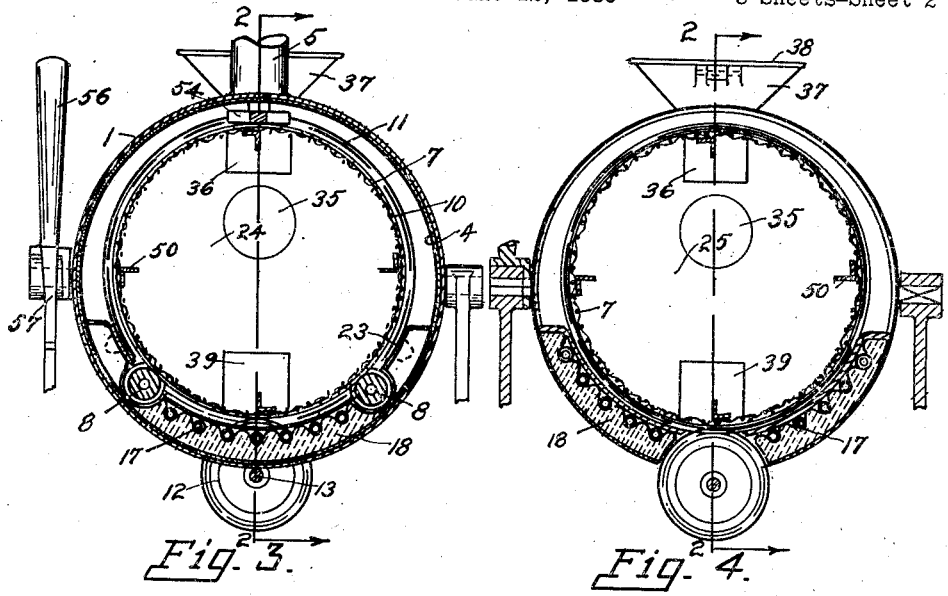
Fig. 3.　　Fig. 4.
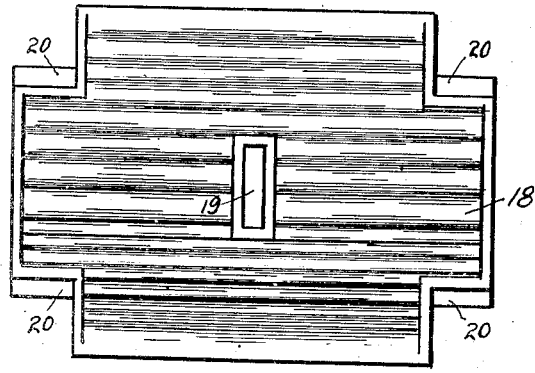　　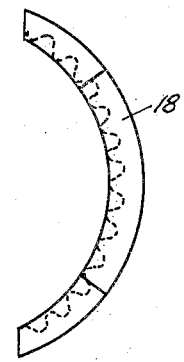
Fig. 5.　　Fig. 6.
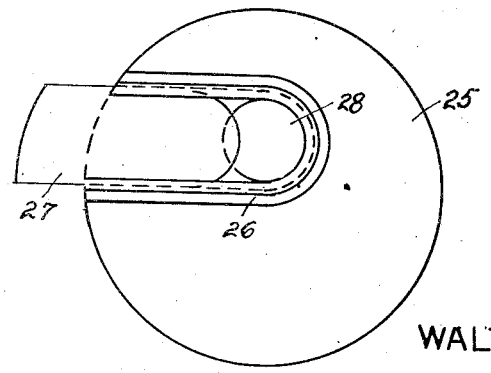
Fig. 7.
WALTER T. BROPHY INVENTOR
BY George E. Adams
ATTORNEY April 7, 1942.　　　W. T. BROPHY　　　2,278,767
COFFEE ROASTER
Filed June 12, 1939　　　3 Sheets-Sheet 3

WALTER T. BROPHY　INVENTOR.

BY George E. Adams
ATTORNEY

Patented Apr. 7, 1942

2,278,767

UNITED STATES PATENT OFFICE 2,278,767

COFFEE ROASTER

Walter T. Brophy, Libby, Mont.

Application June 12, 1939, Serial No. 278,698

3 Claims. (Cl. 34—48)

This invention relates to grain, or coffee roasters, with special reference to that class of roasters suitably adapted for use in retail grocery stores and the like.

Strictly fresh roasted grain, such as coffee, is an object strived for by all such merchants, and, as their stock of coffee comes roasted from the importers, and in large quantities, the degree of freshness when retailed to their customers, is not altogether uniform, and which condition is materially improved by the use of my invention.

General description

The invention resides in a relatively small structure, capable of roasting electrically, approximately five pounds of coffee or other grains, at each filling: the coffee in its green condition being admitted at the top near one end of the jacket to an open ended cylindrical screen inside the outer shell, and mounted upon four revolving trunnions. Rotation of the screen is accomplished by means of an outside source of power such as a pinion on a shaft driven by a motor, the pinion having contact with a circular or ring gear attached to the periphery of the screen cylinder. Semi-circumferentially arranged is a copper or other metallic plate at the bottom of the screen, under which is an electric heating element embedded in the grooves of a ceramic structure attached to the inside lower portion of the housing around the screen. The screen cylinder revolves on the trunnions, and immediately adjacent to partitions in the outer structure, one of which has the intake and outlet ports for the coffee. The outer jacket is supported on either side by bearings which may be part of a receiving hopper or other framework. A lever, or arm is attached to the shaft extending through one of the bearings for tilting the jacket so that, by opening a gate in the discharge port the roasted coffee may be deposited by gravitation into a receiving hopper or other receptacle.

Since, when the coffee has attained the proper color, or degree of roasting, the heat element should immediately be shut off, the attendants might be otherwise busily engaged, the employment of a photo-electric cell device is utilized for this purpose, but the screen is permitted to rotate until the motive power is shut off manually. A technical explanation of the action of the photo-electric cell device will not be made here, as this is well known to those skilled in the art, so suffice it to say here that the turning of the coffee from green to brown when sufficiently roasted, acts upon the photo-electric cell and its relay to disconnect the heating element.

Objects

The primary object that I hope to attain by the use of this device is to provide a means for supplying instantly the large demand for freshly roasted coffee, and perhaps, in small quantities.

Another object is, the constant attention of an attendant is not required, thereby reducing the cost of the finished product.

These and other objects will become apparent as the details of the device are further disclosed by a more specific description of the parts and explanation of the accompanying drawings which are a part of this application, although it will be apparent that the structure is susceptible of various modifications from that shown, and I claim as my own all such modifications and adaptations as may reasonably fall within the scope of my appended claims.

Drawings

Fig. 3 is a transverse vertical cross section on line 3—3 of Fig. 2.

Fig. 4 is similar to Fig. 3 except that it is taken on line 4—4 of Fig. 2.

Figs. 5 and 6 are top plan and end elevations respectively of the ceramic structure for carrying the heating elements in the inside bottom of the outer shell, or housing jacket.

Fig. 7 is a vertical view of one of the partitions in the outer shell, showing the manner of applying, or the removal of the glass slides over the apertures in the partitions, through which the light rays pass from the starting light to the photo-electric cell.

Figure 1:
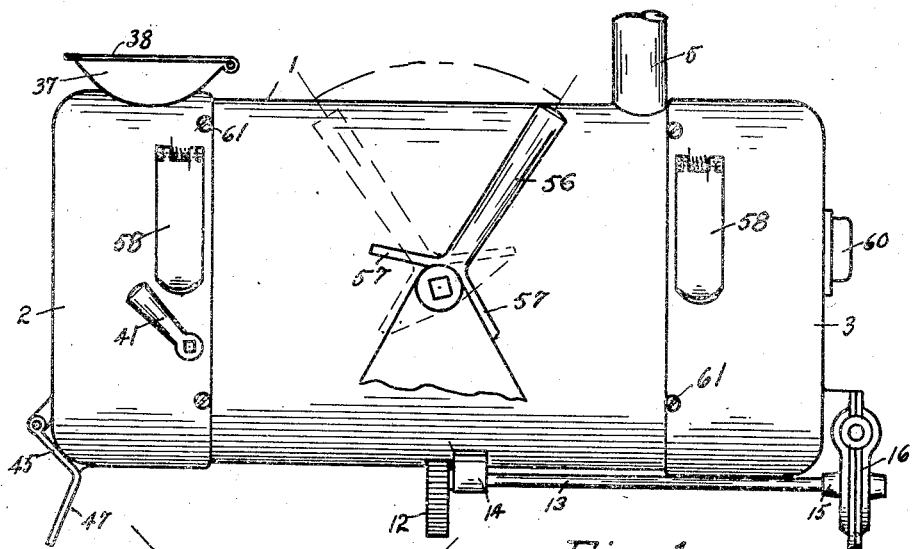
Fig. 1 represents a side elevation of the complete roaster suspended in bearings supported by an exterior framework partially shown, and over a hopper to receive the finished product.

In the drawings which show the best mode and embodiment I have thus far devised for the practical application of my invention, I employ an outer shell, or housing consisting of a central, cylindrical sheet metal portion 1, enclosed at each end by caps 2 and 3, the cylinder 1 being lined inside by sheet asbestos or other heat resisting material 4, and having at one end at the top a ventilating pipe 5 containing an exhaust fan 6 to draw off the smoke and other gases resulting from the roasting process.

Figure 2:
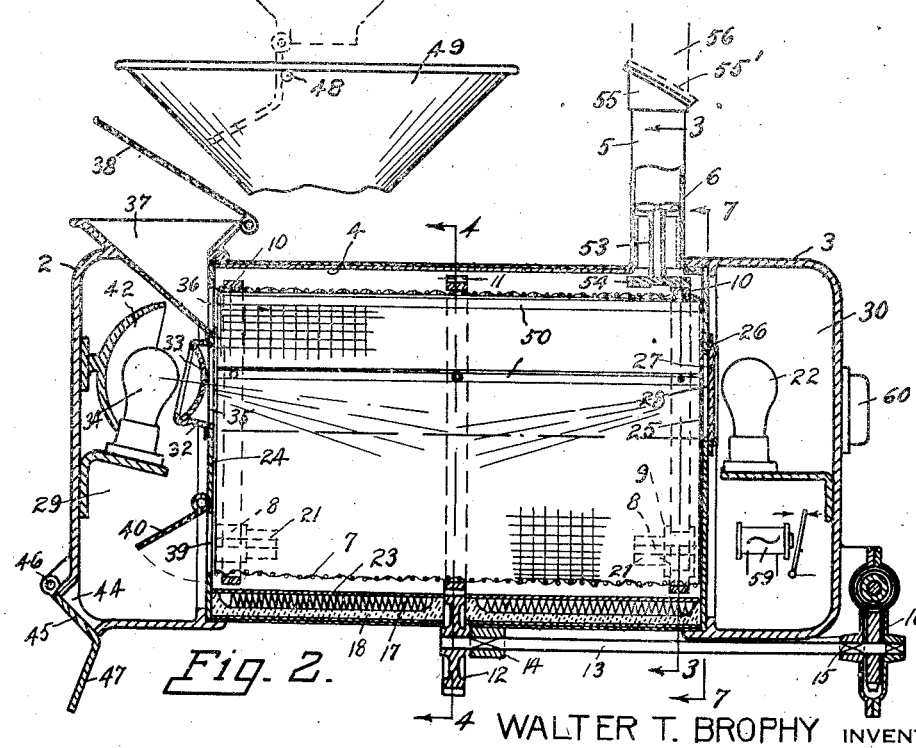
Fig. 2 is a longitudinal cross section of Fig. 1, through its vertical center, taken on lines 2—2 of Figs. 3 and 4.

Inside the cylinder 1 and preferably located eccentrically thereto as shown in Figs. 2, 3, and 4, I employ a revolving screen 7 supported by the four trunnions 8, one opposing pair of which is provided with flanges 9 to prevent lateral movement of the rotatably mounted screen 7 thereon, contact with the rollers 8 being through circular bands or rings 10 anchored to each end of screen 7.

At a convenient point, in this instance near the center of screen 7, I employ an annular gear 11, anchored to the periphery of screen 7 for contact with a driving pinion 12 on shaft 13, supported in suitable bearings 14 and 15, and to said shaft 13 is attached a speed reducing or worm drive mechanism 16 which is subsequently activated by any suitable source of power, as an electric motor, not shown. Located longitudinally of the inside bottom of cylinder 1 is the heating element 17 in the grooves of the insulator, or ceramic structure 18, and which are suitably connected with a source of electric current. The ceramic insulator 18 is provided with an aperture 19 for the introduction of the driving pinion 12, and is also fashioned at its four corners as at 20 to accommodate the bearings 21 for the trunnion rollers 8.

To exclude light rays glowing from the heat element 17 from the interior of the roasting chamber which would adversely react on the photo-electric cell 22, and referred to more specifically later, I provide a copper, or other metallic plate 23 interposed between the heat element 17 and the revolving screen 7.

Located adjacent each end of revolving screen 7, and in the caps 2 and 3, are partitions 24 and 25 respectively, to prevent the coffee from entering the chambers 29 and 30 of caps 2 and 3. In partition 25 is located a grooved slide frame 26 into which is slidably admitted a glass plate 27 to cover the aperture 28, and which admits the light rays from the starter light 34 to the photo-electric cell 22 in chamber 30. Partition 24 is similarly provided with a grooved slide frame 32 to slidably carry a convex lens 33 through which the rays from the starter light 34 are projected into the cylindrical screen 7 through an aperture 35 in the partition 24. Immediately above the aperture 35 is located the intake port 36, communicating with the filling hopper 37, hingedly attached to which is a protecting and light excluding cover 38. At the base of partition 24 is the discharge port 39, which is closed by a hingedly supported and spring held swing gate 40, manually operated by the exteriorly located handle 41.

Cap 2 carries, in its chamber 29, the reflector 42, the starter light 34, lens 33 and suitable mountings for same, while at the lower part of chamber 29 is located an exit 44, covered by a hinged gate 45 which is kept normally closed by a spring hinge 46; gate 45 is provided with a depending arm 47 which, when the roaster is tilted to the dotted line, or discharge position of Fig. 1, has opened gate 45 by its having contacted a pin or stop 48 on the receiving hopper 49, so that when handle 41 is pulled to the right, the roasted coffee will be discharged to the hopper 49.

Wiring diagrams

Figure 8:
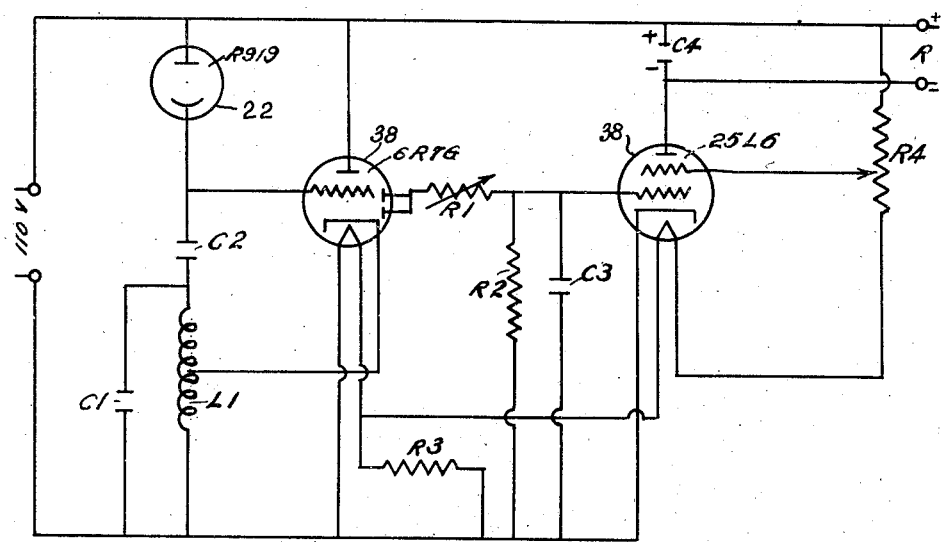
Figs. 8 and 9 illustrate the electric circuit used in connection with the photo-electric cell.

With reference to Fig. 8, or light measurement circuit, this diagram contemplates the use of two lamps 38' consisting of conventional types of radio tubes, 6R7G and 25L6, with the type R919 photo tube 22, the latter being a sensitive photo tube of vacuum type construction with a top cap cathode connection in order to have high resistance to leakage currents between electrodes. The tube 22 is capable of connection with relay 59 that will operate when 25 mil. of current is flowing through it. The resistor R1 is actually a sensitivity control, and the entire unit operates from a 110 v. source, either A. C. or D. C. The triode section of the tube 6R7G, or duodiode medium mu triode, starts to oscillate, with the inductance L1 and capacity C1 as the tank circuit, and as indicated in the schedule shown below. The oscillations soon stop because the grid builds up a negative charge on condenser C2 and blocks the tube. Oscillation starts again when the grid draws enough positive charge thru R919 to unblock it. The same cycle, oscillation followed by cut-off is repeated. The duration of the cut-off period depends upon the rate of flow of charge through R919, which in turn depends upon the illumination of the latter. Such a circuit may be adjusted to operate a relay when a certain amount of light is reflected on the photo-cell, and this light may be the result of the change in color of various objects, including roasted coffee.

Values for the different reference characters in Fig. 8 follow:

$C1$ = 20 to 150 micromicrofarads.
$C2$ = 50 micromicrofarads.
$C3$ = .5 microfarad.
$C4$ = 4 microfarads.
$L1$ = 1 to 10 millihenrys, center tapped.
$R$ = 0–25 milliampere relay.
$R1$ = 100,000 ohm variable resistance.
$R2$ = 5 megohm resistance.
$R3$ = 50 ohms, 1 watt.
$R4$ = 280 ohms, 25 watts.

Figure 9:
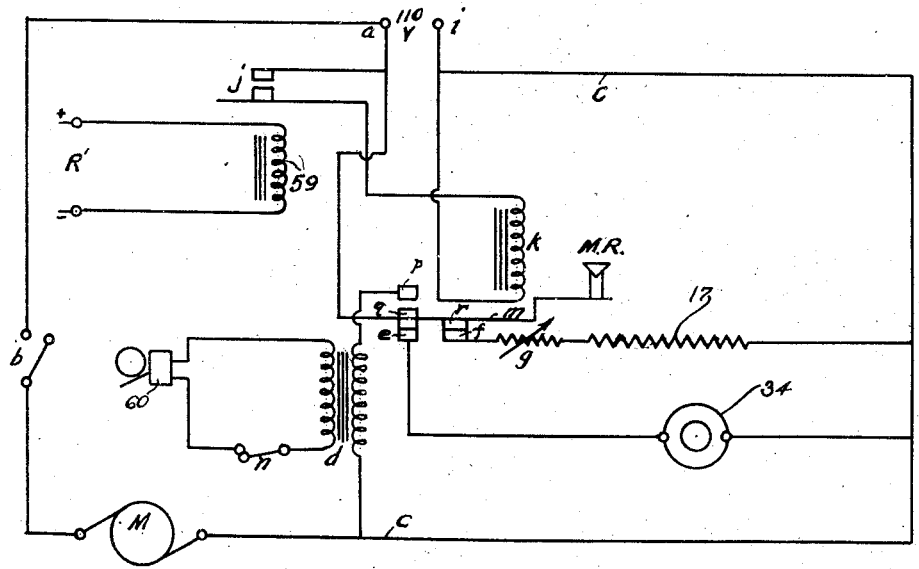

The diagram of Fig. 8 is connected at R to points R' in Fig. 9 and also the 110 v. circuit at A B, Fig. 8 connects with points $a$ $i$, Fig. 9. Assuming that a charge of coffee is in the roaster ready for treatment: also that the manual re-set MR, Fig. 9 has been set to close the circuit to starter light 34 and heater 17, now close switch $b$ which puts the roaster in motion and the roasting begins, and continues until the desired degree of color is attained in the coffee which reduces the volume of light reflected in R919, causing a decrease in the flow of current from the photo-electric circuit, occasioning the release of magnetism in relay 59, permitting the closing of contact points $j$, energizing second relay $k$, raising bar $m$ which opens contacts $r$ and $e$, thus shutting off the starter light 34 and heater 17; at the same time contacts $p$ and $q$ close, ringing bell 60, which may be discontinued by the operator opening switch $n$. In the above, it will be obvious that the rays of light are reflected to R919 from 38 through the medium of the tubes 6R7G and 25L6, and terminated by the color of the roasted coffee. Switch $b$ is now manually opened and all current is shut off, as the complete circuit is opened thereby.

Located inside and longitudinally therewith, are anchored agitators 50 for stirring the coffee during the roasting process.

To furnish means for the escape of the smoke and gases due to the roasting process, and which would otherwise permeate the room, I provide an exhaust fan 6 housed in an upwardly disposed pipe 5, rotatably supported by a bearing 53, and rotated by means of a friction wheel 54 contacting one of the rotating bands 10, said exhaust pipe 5 having a shoe 55 which, when the roaster is in normal position, contacts a co-acting shoe 55' on a stationarily located exhaust pipe 56 but is disconnected therefrom when the roaster is tilted to the discharge position, which is effected by pushing handle 56 to the left as in the dotted lines of Fig. 1, the handle 56 being provided with stops 57 to limit the travel of the roaster in either direction.

Hinge spring covers 58, when opened, permit the glass slide 27, Fig. 7, and the lens 33, Fig. 2, to be withdrawn, cleaned, and replaced. The relay 59 is diagrammatic only, and should be fashioned to suit the photo-electric equipment employed.

A buzzer 60 may be employed to warn the users that the coffee is roasted and ready for grinding and delivery.

Caps 3 and 4 may be attached to cylinder jacket 1 by any suitable means as by screws 61, Fig. 1.

Having thus fully disclosed the construction and operation of my invention, what I claim as new and desire to secure by Letters Patent of the United States is:

1. In a coffee roasting apparatus, a cylindrical casing pivotally mounted to swing from a horizontal to an inclined position, a cylindrical screen arranged within the casing and rotatably mounted upon trunnions, power means for rotating said screen, a semi-cylindrical ceramic body having heating coils arranged therein and positioned on the interior of the casing beneath the screen, an outlet pipe leading from the upper portion of the casing and adapted to be brought into registry with a stationary exhaust pipe when the casing is in the horizontal position, and means for moving the casing from the horizontal to the inclined position to discharge the roasted coffee.

2. In a coffee roasting apparatus, a cylindrical casing, a compartment in each end of the casing, a cylindrical screen rotatably mounted within the casing between the compartments, a power means for rotating the screen, an electric heating element within the casing and positioned below the screen, in combination with a reflector and lamp arranged within one of the end compartments, a photo-electric cell positioned within the other of said end compartments, means for directing light from the lamp downwardly to the coffee, said light being reflected by the coffee to the photo-electric cell and a relay actuated by the photo-electric cell to control the circuit to the electric heating element in accordance with the color of the roasted coffee.

3. In a coffee roasting apparatus, a casing having two end compartments therein with light openings leading into a central chamber, a screen rotatably mounted within the central chamber, an electric heating element arranged below the screen, in combination with a light reflector and lamp arranged within one of the end compartments, a photo-electric cell positioned within the other of said end compartments, means for directing light from the lamp downwardly to the coffee, said light being reflected by the coffee to the photo-electric cell and a relay operated by the photo-electric cell to control the action of the electric heating element in accordance with the color of the roasted coffee.

WALTER T. BROPHY.